United States Patent
Ko

(10) Patent No.: US 12,376,579 B2
(45) Date of Patent: Aug. 5, 2025

(54) ZAPPER

(71) Applicant: Ted Ko, Irvine, CA (US)

(72) Inventor: Ted Ko, Irvine, CA (US)

( * ) Notice: Subject to any disclaimer, the term of this patent is extended or adjusted under 35 U.S.C. 154(b) by 0 days.

(21) Appl. No.: 18/402,160

(22) Filed: Jan. 2, 2024

(65) Prior Publication Data

US 2025/0212864 A1 Jul. 3, 2025

(51) Int. Cl.
*A01M 1/22* (2006.01)
*A01M 1/04* (2006.01)

(52) U.S. Cl.
CPC .............. *A01M 1/223* (2013.01); *A01M 1/04* (2013.01)

(58) Field of Classification Search
CPC .... A01M 1/223; A01M 1/145; A01M 1/2022; A01M 1/2033; A01M 1/2044; A46B 13/00; A46B 15/0055; A46B 2200/3073; A46B 2200/30; A46B 5/00; A46B 13/02; B08B 1/12; B08B 9/023; B08B 9/021; A47L 25/12
See application file for complete search history.

(56) References Cited

U.S. PATENT DOCUMENTS

| 8,875,437 | B1 * | 11/2014 | Xie | A01M 1/223 43/112 |
|---|---|---|---|---|
| 12,058,993 | B2 * | 8/2024 | Sabic | A01M 1/223 |
| 2019/0307113 | A1 * | 10/2019 | Horne | A01M 1/04 |
| 2020/0138003 | A1 * | 5/2020 | Shoemaker, Jr. | G09F 13/0413 |
| 2020/0281181 | A1 * | 9/2020 | Flowers | A46B 5/00 |
| 2021/0120802 | A1 * | 4/2021 | He | A01M 1/223 |
| 2022/0110308 | A1 * | 4/2022 | Sabic | A01M 1/223 |
| 2022/0386586 | A1 * | 12/2022 | Cran | A01M 1/04 |
| 2023/0292731 | A1 * | 9/2023 | Zheng | A01M 1/223 43/112 |

FOREIGN PATENT DOCUMENTS

CN 117121888 A * 11/2023

* cited by examiner

*Primary Examiner* — Peter M Poon
*Assistant Examiner* — Shada Mohamed Alghailani
(74) *Attorney, Agent, or Firm* — Muncy, Geissler, Olds & Lowe, P.C.

(57) ABSTRACT

A zapper includes an insect-inducing wick, an electric shock coil, a power supply module, a lamp housing, and a cleaning brush. The lamp housing includes a plurality of lateral ribs spaced apart, a plurality of longitudinal ribs spaced apart and intersecting the lateral ribs, and a plurality of openwork portions formed between the lateral ribs and the longitudinal ribs. At least one of the longitudinal ribs is formed with a longitudinal track in openwork-shaped thereon. The cleaning brush includes a brush body disposed around the insect-inducing wick and selectively contacting the electric shock coil, and at least one operation member connected to the brush body and operable to move along the longitudinal track. The at least one operation member includes a connection portion extending through the longitudinal track into the lamp housing to connect to the brush body, and an operation portion exposed outside the lamp housing.

11 Claims, 6 Drawing Sheets

ZAPPER

FIELD OF THE INVENTION

The present invention relates to a zapper, particularly to a zapper having a cleaning brush.

BACKGROUND OF THE INVENTION

US patent publication no. US20200281181 A discloses a pest control lamp having a cleaning brush to solve a problem that the pest control lamp is required to be turned off and disassembled when cleaning thereof. The cleaning brush is disposed to face an electric shock coil and includes at least one handle member extending through an openwork portion of a surface of a lamp housing, the at least one handle member is displaced along the openwork portion of the surface of the lamp housing under operation, and thereby driving the cleaning brush to clean the electric shock coil.

According to the disclosure of US 20200281181A, cleaning is carried out with a straight stick handle brush; however, the cleaning brush can only clean a localized area of the electric shock coil, which is not conducive to implementation. In addition, an area of the electric shock coil that is cleaned by conventional cleaning brushes depends on a range of displacement of the handle member limited to the openwork portion of the surface of the lamp housing. Further, the cleaning brush is limited by a pattern of the openwork portion of the surface of the lamp housing, the portion of the electric shock coil can only be cleaned at the same height position, and the handle member is limited by a structure of the lamp housing and can only have a small displacement, resulting in only the localized area being cleaned by the cleaning brush and failing to provide an efficient cleaning to the electric shock coil.

SUMMARY OF THE INVENTION

The main object of the present invention is to solve the problem that cleaning brushes of conventional zappers cannot provide a good cleaning effect on the electric shock coil.

In order to achieve the above object, the present invention provides a zapper, including an insect-inducing wick, an electric shock coil surrounding the insect-inducing wick, a power supply module electrically connecting the insect-inducing wick and the electric shock coil, a lamp housing in which the insect-inducing wick and the electric shock coil are provided and connected to the power supply module, and a cleaning brush. The lamp housing includes a plurality of lateral ribs spaced apart, a plurality of longitudinal ribs spaced apart and intersecting the plurality of lateral ribs, and a plurality of openwork portions formed between the plurality of lateral ribs and the plurality of longitudinal ribs. At least one of the plurality of longitudinal ribs is formed with a longitudinal track in openwork-shaped thereon. The cleaning brush includes a brush body disposed around the insect-inducing wick and selectively contacting the electric shock coil, and at least one operation member connected to the brush body and operable to move along the longitudinal track. The at least one operation member includes a connection portion extending through the longitudinal track into the lamp housing to connect to the brush body, and an operation portion exposed outside the lamp housing. The at least one operation member is operated to move along the longitudinal track to drive the brush body to make a longitudinal displacement within the lamp housing to implement cleaning of the electric shock coil.

In one embodiment, the lamp housing includes a top end and a bottom end, the longitudinal track includes a trunk between the top end and the bottom end, and a manifold connected to the trunk and close to the top end, wherein the cleaning brush is restricted in position when the connection portion of the at least one operation member enters the manifold.

In one embodiment, the lamp housing includes a base, and an induced fan disposed of on the base.

In one embodiment, the lamp housing includes a perforation formed on the base for the induced fan to be disposed therein, a space connected to the perforation, and a drawer disposed in the space and capable of being taken out from a surface of the lamp housing.

In one embodiment, the power supply module is disposed at a side close to the top end of the lamp housing, the power supply module includes at least one solar panel, an energy storage unit, and a work management module connecting to the at least one solar panel, the insect-inducing wick, and the electric shock coil.

In one embodiment, the power supply module includes at least one power input port electrically connected to the work management module.

In one embodiment, the zapper includes at least one operation switch exposed on a surface of the zapper electrically connected to the work management module.

In one embodiment, the zapper includes at least one light-emitting decorative component disposed between the lamp housing and the power supply module.

In one embodiment, the lamp housing includes a perforation formed on the base, a space connected to the perforation, and a drawer disposed in the space and capable of being taken out from a surface of the lamp housing.

By implementing the foregoing embodiments of the present invention, the lamp housing has characteristics as follows: the plurality of lateral ribs, the plurality of longitudinal ribs, and the plurality of openwork portions, the at least one of the plurality of longitudinal ribs is formed with the longitudinal track thereon, the at least one operating member is operated to move along the longitudinal track to drive the brush body to make a longitudinal displacement within the lamp housing to implement cleaning of the electric shock coil.

DETAILED DESCRIPTION OF THE PREFERRED EMBODIMENTS

Figure 1:
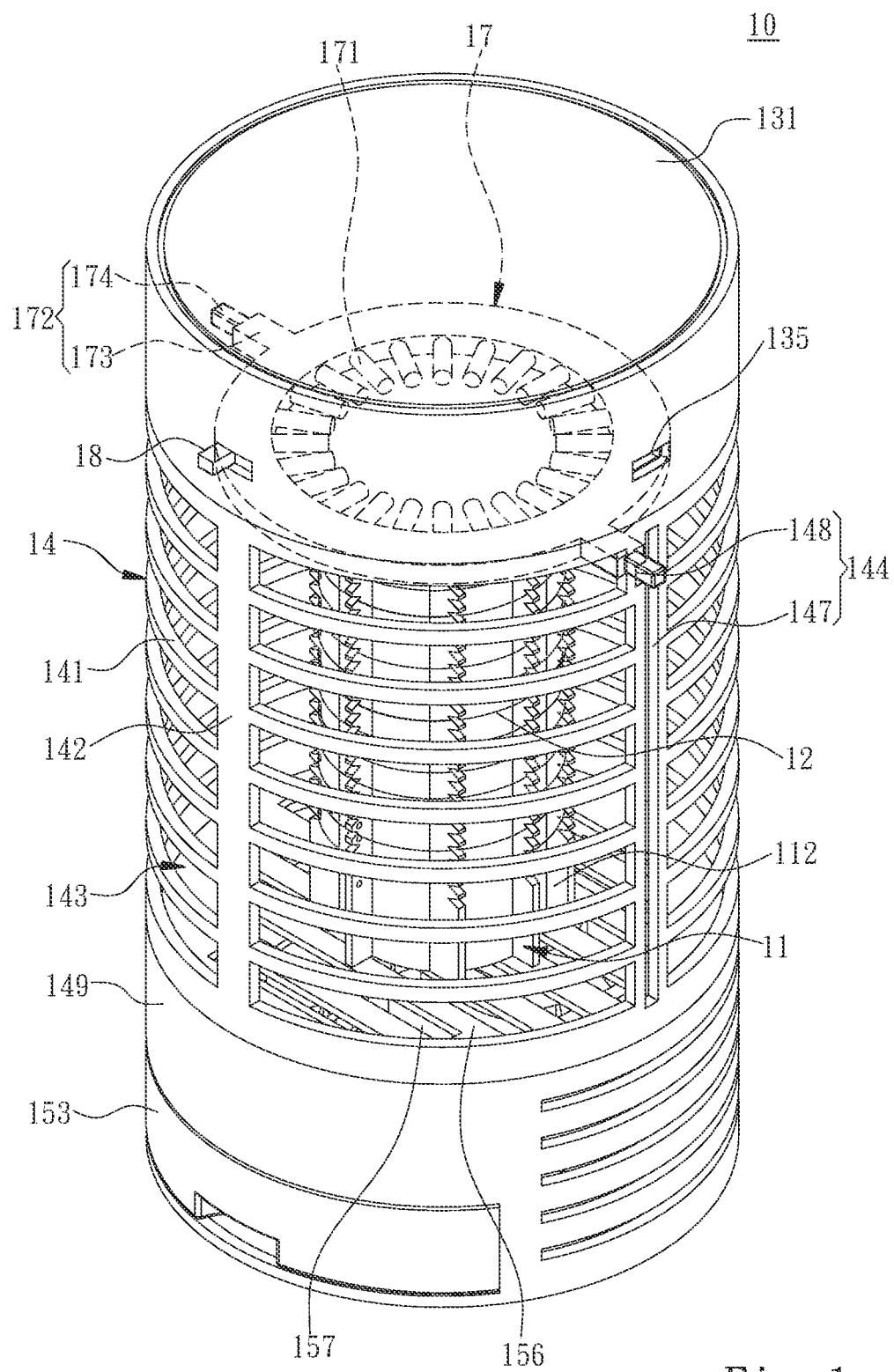
FIG. 1 is a schematic view of the three-dimensional structure of the first embodiment of the present invention.

The technical contents of the present invention are described as follows with reference to the accompanying drawings.

Referring to FIG. 1, FIG. 2, FIG. 3, and FIG. 4, the present invention provides a zapper 10, including an insect-inducing wick 11, an electric shock coil 12, a power supply module 13, a lamp housing 14, and a cleaning brush 17. The power supply module 13 provides power, and the power supply module 13 may be receiving utility power or solar energy to drive the insect-inducing wick 11 and the electric shock coil 12. The insect-inducing wick 11 is connected to the power supply module 13 and driven to produce at least one light with a special wavelength to attract insects to approach effectively. The electric shock coil 12 is connected to the power supply module 13 and disposed to surround the insect-inducing wick 11, and the electric shock coil 12 provides an electric shock function to the insects after activation.

The lamp housing 14 provides the insect-inducing wick 11 and the electric shock coil 12 to be disposed therein and is assembled with the power supply module 13. The lamp housing 14 includes a plurality of lateral ribs 141, a plurality of longitudinal ribs 142, and a plurality of openwork portions 143, the plurality of lateral ribs 141 are arranged in transverse intervals, the plurality of longitudinal ribs 142 are arranged in longitudinal intervals, and the plurality of longitudinal ribs 142 intersect with the plurality of lateral ribs 141. In other words, the plurality of lateral ribs 141 and the plurality of longitudinal ribs 142 jointly form a fence-shaped structure, and the plurality of openwork portions 143 are formed between the plurality of lateral ribs 141 and the plurality of longitudinal ribs 142 to form penetrable points of the fence-shaped structure. At least one of the plurality of longitudinal ribs 142 is formed with a longitudinal track 144 thereon, the longitudinal track 144 is openwork-shaped to provide setting and guiding functions.

The cleaning brush 17 includes a brush body 171 and at least one operation member 172. The brush body 171 is designed to solve the conventional problem of a straight stick handle brush that only can implement localized cleaning. The brush body 171 is disposed to surround the insect-inducing wick 11 and selectively contacted to the electric shock coil 12 without conduction. When the brush body 171 is displaced relative to the electric shock coil 12, foreign objects (such as insect corpses, etc.) attached to the electric shock coil 12 can be removed in a 360-degree manner. The at least one operation member 172 is disposed in the longitudinal track 144 and connected to the brush body 171, the at least one operating member 172 is guided by the longitudinal track 144 after being operated and is displaced along the longitudinal track 144 to drive the brush body 171 making a longitudinal displacement 175 within the lamp housing 14. Specifically, the at least one operation member 172 includes a connection portion 173 and an operation portion 174, the connection portion 173 extends through the longitudinal track 144 into the lamp housing 14 to connect the brush body 171, and the operation portion 174 is connected to the connection portion 173 to be exposed outside the lamp housing 14 for gripping.

Please refer to FIG. 1, FIG. 2, FIG. 3, and FIG. 4 for illustrating an implementation of the zapper 10. Assuming the zapper 10 is not activated initially, and insects are not attracted, the foreign objects (such as insect corpses, etc.) has yet to attach to the electric shock coil 12. When the zapper 10 is activated, the power supply module 13 supplies electrical power to the insect-inducing wick 11 and the electric shock coil 12, the insect-inducing wick 11 emits the at least one light to attract insects. When the insects enter through the plurality of openwork portions 143 of the lamp housing 14 and contact the electric shock coil 12 to form a conductive relationship, the insects are electrocuted and dying and may be attached to the electric shock coil 12. If users intend to clean the electric shock coil 12, they may hold the operation portion 174 of the at least one operation member 172 and drive the connection portion 173 of the at least one operation member 172 to move along the longitudinal track 144, so that the brush body 171 contacts the electric shock coil 12 at the time making the longitudinal displacement 175 within the lamp housing 14 to remove the foreign objects on the electric shock coil 12 in the 360-degree manner.

It can be understood from the above, the present invention provides an arrangement of the longitudinal track 144 to guide the displacement of the cleaning brush 17, so that the brush body 171 driven by the at least one operation member 172 makes the longitudinal displacement 175 inside the lamp housing 14. Compared to prior art, the longitudinal track 144 of the present invention is provided as a guide, and the brush body 171 contacts an entirety of the electric shock coil 12 at the time making the longitudinal displacement 175, which improves a problem that the conventional cleaning brushes can only clean a localized area of the electric shock coil in a small scope, and can greatly enhance cleaning efficiency of the cleaning brush 17 to the electric shock coil 12.

Further, please refer to FIG. 1, FIG. 2, FIG. 3, and FIG. 4, the present invention provides stowing the cleaning brush 17. In an embodiment, the lamp housing 14 includes a top end 145 and a bottom end 146, the longitudinal track 144 includes a trunk 147 and a manifold 148, the trunk 147 is located between the top end 145 and the bottom end 146, the trunk 147 is substantially longitudinal in orientation, the manifold 148 connects to and diverges from the trunk 147, and the manifold 148 extends in a direction different from the trunk 147 to limit the cleaning brush 17. Also, the manifold 148 is located at the top end 145 close to the lamp housing 14, when the connection portion 173 of the at least one operation member 172 enters the manifold 148, the cleaning brush will be restricted to a position without affecting the implementation of the electric shock coil 12, thereby accomplishing a purpose of stowing the cleaning brush 17 and not affecting insecticidal effectiveness of the zapper 10.

In addition, in an embodiment, the lamp housing 14 includes a base 149 and an induced fan 150, the base 149 is located at the bottom end 146 of the lamp housing 14, and the induced fan 150 is located on the base 149 and activated when the cleaning brush 17 is operated to clean the electric shock coil 12, the induced fan 150 generates wind in the lamp housing 14 and flows a direction toward the base 149 to assist in cleaning the foreign objects attracted and dropped from the electric shock coil 12 to improve cleaning efficiency. The induced fan 150 may also be turned on when the zapper 10 is activated, and wind generated by the induced fan 150 can attract insects close to but not in contact with the electric shock coil 12, improving the insecticidal effectiveness of the zapper 10.

In an example of the present invention for collecting foreign objects such as insect corpses, the lamp housing 14 includes a perforation 151, a space 152, and a drawer 153, the perforation 151 is formed on the base 149 and communicated to an interior of the lamp housing 14, the space 152 is formed by the base 149 and communicated to the perforation 151, and the drawer 153 is provided inside the space 152 and includes an opening facing the perforation 151, the drawer 153 may receive the foreign objects from the interior of the lamp housing 14 and fall through the perforation 151 to the interior of the drawer 153. The drawer 153 can be separated from the lamp housing 14, the drawer 153 can be taken out from a surface of the lamp housing 14 if the drawer 153 is proposed to be emptied. Further, the drawer 153 may be provided with at least one insecticidal sticker to assist in improving the insecticidal effectiveness of the zapper 10.

According to the above, in this embodiment, the induced fan 150 can be implemented with the drawer 153, the induced fan 150 is located in the perforation 151, an inlet side 154 of the induced fan 150 faces the electric shock coil 12, and an outlet side 155 of the induced fan 150 faces the drawer 153, when the induced fan 150 is activated to draw the foreign objects attached to the electric shock coil 12 and discharge to the drawer 153. In another embodiment, the lamp housing 14 further includes a partition 156 located at the bottom end 146 of the lamp housing 14, i.e., the partition 156 is located on a side of the lamp housing 14 close to the base 149 to provide the electric shock coil 12 and the insect-inducing wick 11 being disposed thereon, and the partition 156 is formed with at least one through-hole 157 communicating with the interior of the lamp housing 14 and the perforation 151.

Figure 2:
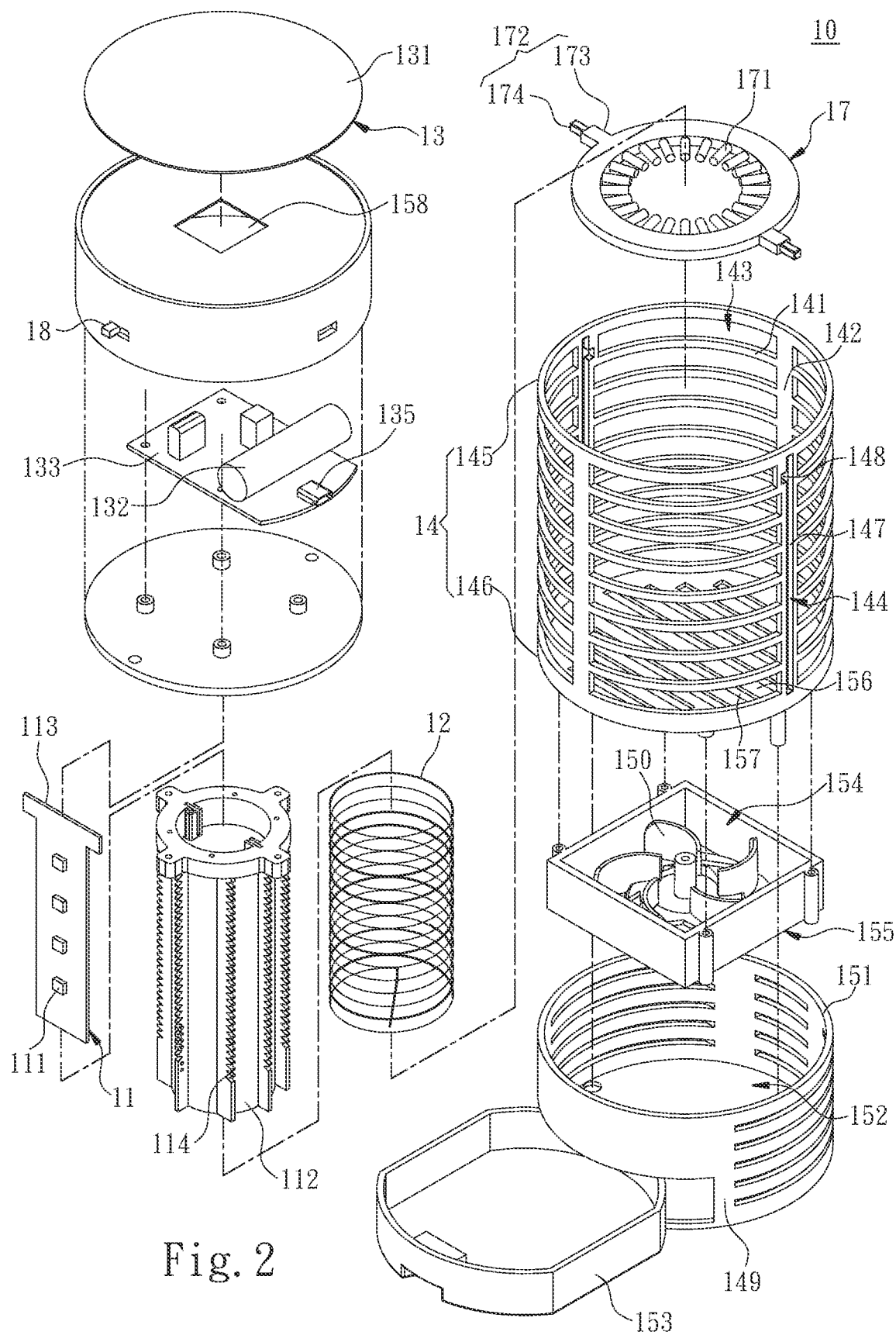
FIG. 2 is a first exploded view of the first embodiment of the present invention.
Figure 3:
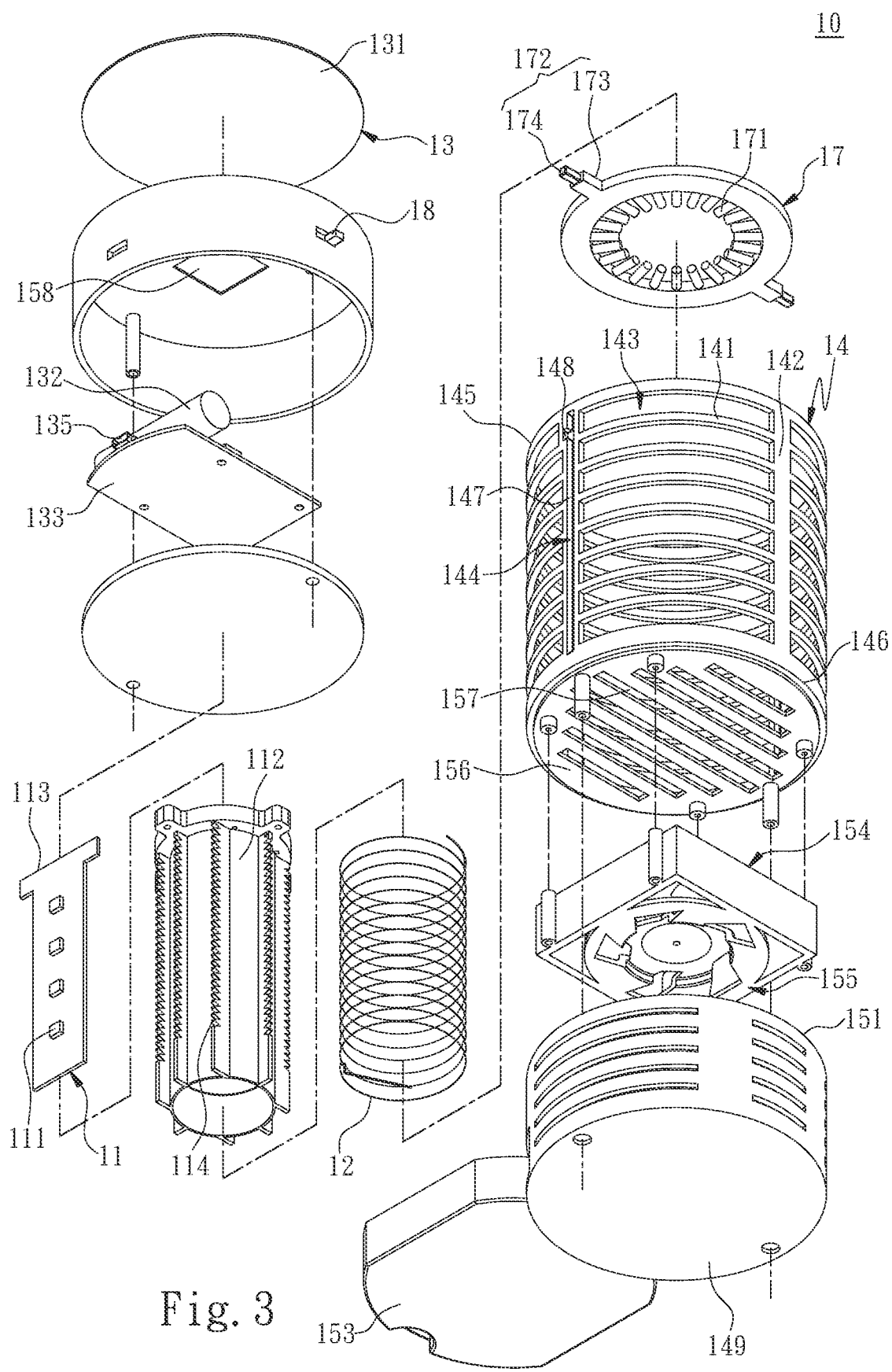
FIG. 3 is a second exploded view of the first embodiment of the present invention.
Figure 4:
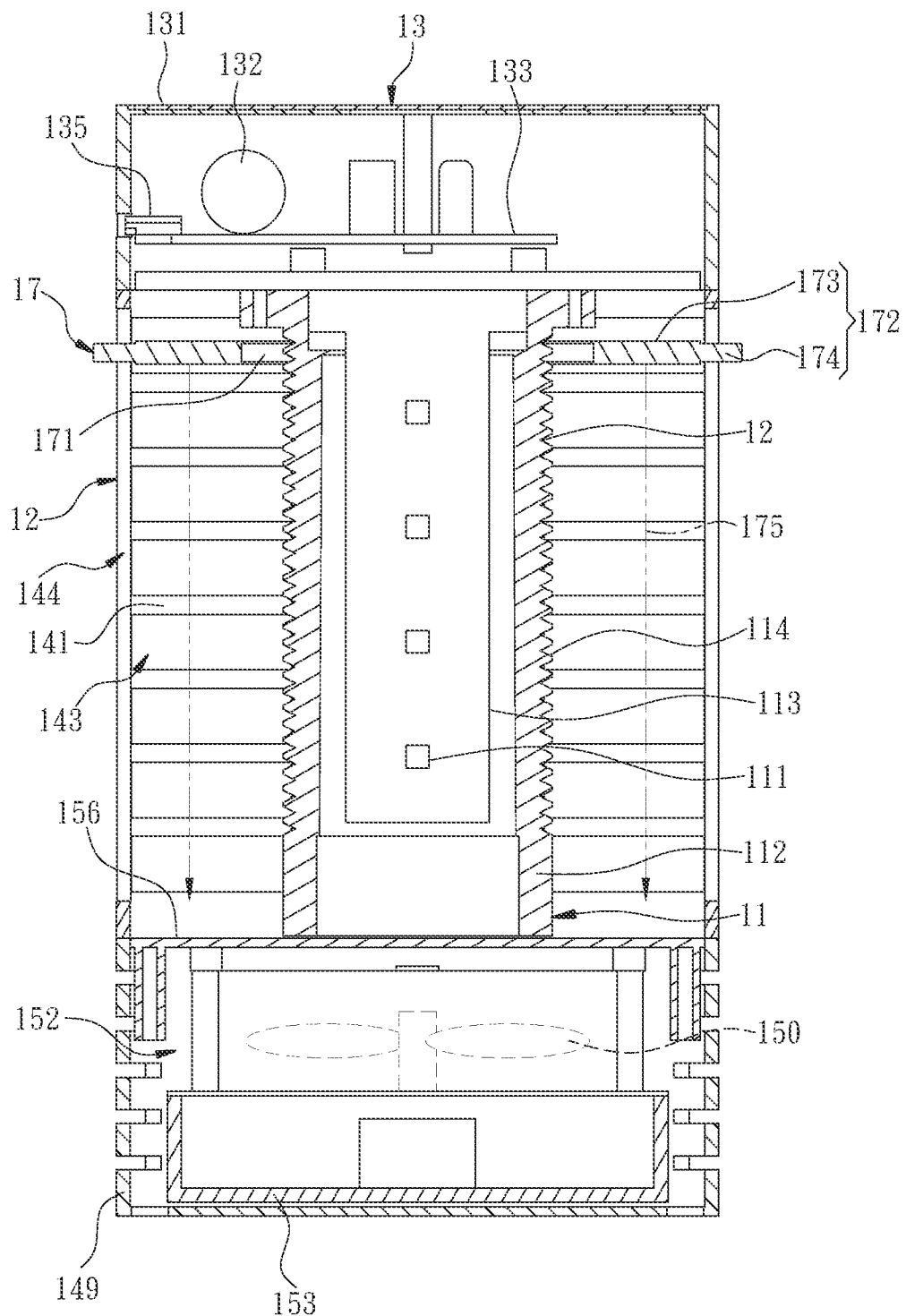
FIG. 4 is a cross-section view of the first embodiment of the present invention.

Further referring to FIG. 2, FIG. 3, and FIG. 4, in an embodiment, the power supply module 13 of the present invention is located at an upper portion of the lamp housing 14, and in a further embodiment, the power supply module 13 is located at a side of the lamp housing 14 close to the top end 145. the power supply module 13 is equipped with a waterproof function so that the zapper 10 can be placed indoors or outdoors. The power supply module 13 includes at least one solar panel 131, an energy storage unit 132, and a work management module 133 connecting to the at least one solar panel 131, the energy storage unit 132, the insect-inducing wick 11, and the electric shock coil 12. The energy storage unit 132 is equipped with a power storage function, which may be a battery. The at least one solar panel 131 receives the sunlight. The work management module 133 converts solar energy from the at least one solar panel 131 into a working power, and stores the working power in the energy storage unit 132, thereby the zapper 10 can be charged by solar energy when placing outdoors. When the zapper 10 is activated, the work management module 133 drives the energy storage unit 132 to release a stored working power to the insect-inducing wick 11 and the electric shock coil 12, so that the insect-inducing wick 11 and the electric shock coil 12 work. In another embodiment, the power supply module 13 further includes at least one power input port 135 located in the lamp housing 14 and electrically connected to the work management module 133, the at least one power input port 135 is configured to receive power input, which may be a USB port or the like, thereby the zapper 10 can be charged by the at least one power input port 135 when placing indoors.

In an embodiment, the at least one solar panel 131 is disposed on a surface of the lamp housing 14, the energy storage unit 132 and the work management module 133 are located in the lamp housing 14, the lamp housing 14 is formed with at least one through-hole 158 so that the at least one solar panel 131, the energy storage unit 132, and the work management module 133 form an electrically connection relationship.

Further, the insect-inducing wick 11 includes a plurality of light-emitting components 111 and a lamp barrel 112, each of the plurality of light-emitting components 111 is a blue LED capable of emitting the special wavelength, a plurality of LEDs are located on a lamp plate 113 at intervals, the plurality of light-emitting components 111 and the work management module 133 are electrically connected, and light-emitting modes of the plurality of light-emitting components 111 are varied based on a control of the work management module 133, such as blinking, always light on, etc. It can be understood that the present invention does not limit the light-emitting modes of the plurality of the light-emitting components but takes the insect-inducing wick 11 to attract the insects approaching as a primary implementation. The lamp barrel 112 is a light-transmissible material to provide the plurality of light-emitting components 111 being disposed therein and is connected to the lamp plate 113, the lamp barrel 112 is capable of assisting in a dispersion of light, and the lamp plate 113 is restricted in position in the lamp housing 14. In addition, the electric shock coil 12 is disposed on a periphery of the lamp barrel 112, the lamp barrel 112 is formed with at least one assembly slot 114 for disposal of the electric shock coil 12.

Continuously, the zapper 10 further includes at least one operation switch 18 electrically connected to the work management module 133 of the power supply module 13 and exposed on a surface of the zapper 10 for operation. The at least one operation switch 18 determines control of the insect-inducing wick 11 by the work management module 133 based on an operated state, such as controlling opening and closing of the insect-inducing wick 11, the light-emitting modes, and the like.

Figure 5:
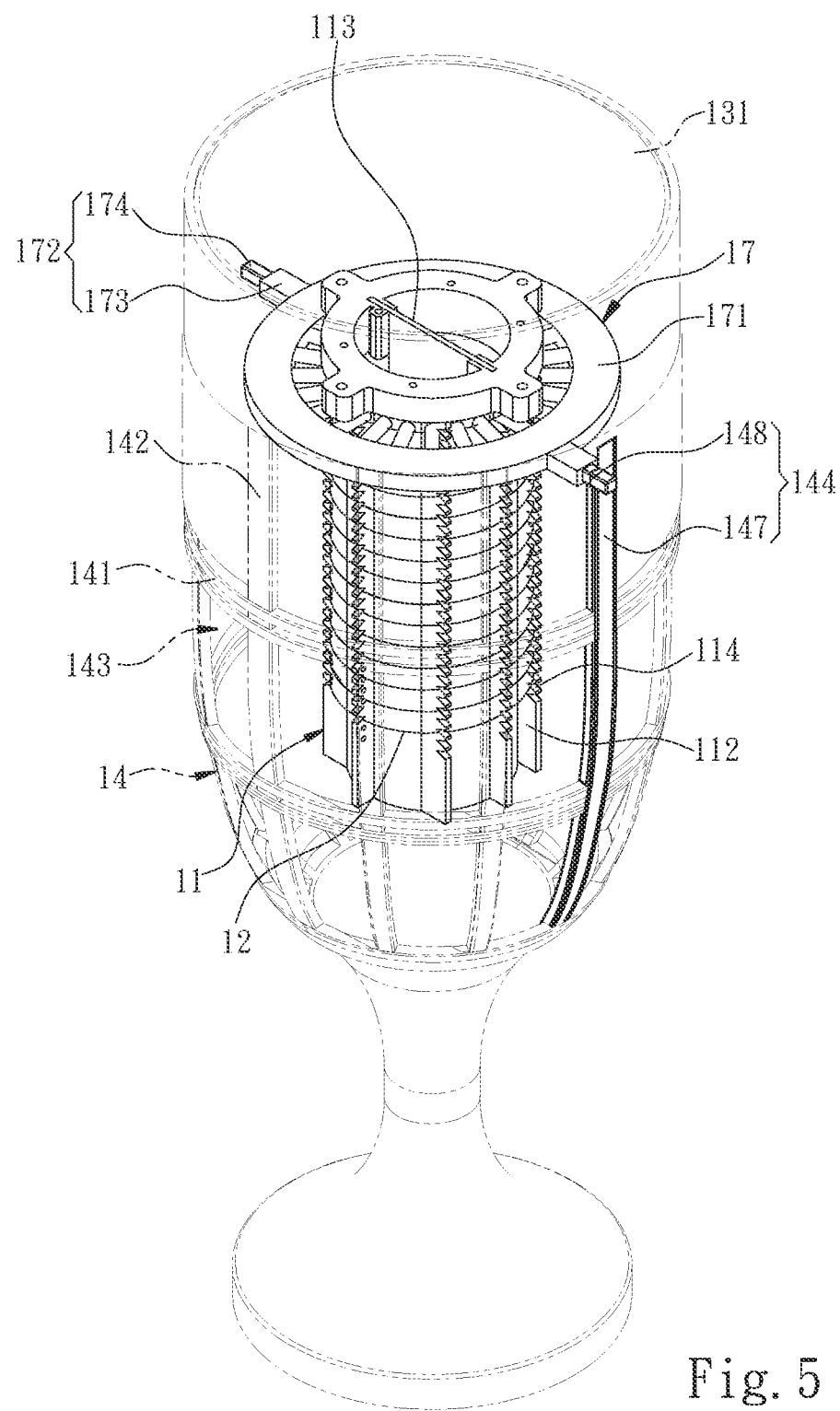
FIG. 5 is a schematic view of the three-dimensional structure of a second embodiment of the present invention.
Figure 6:
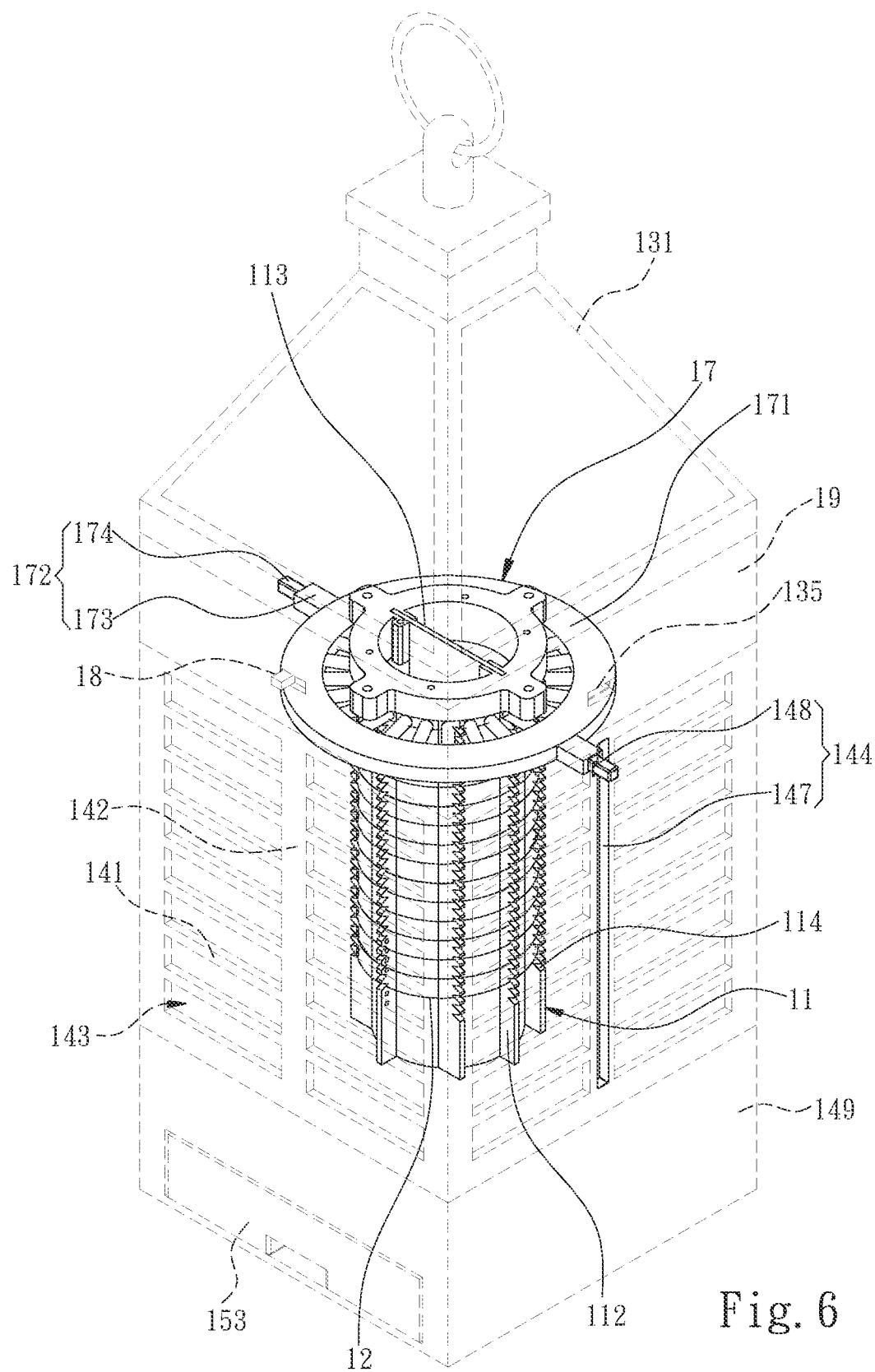
FIG. 6 is a schematic view of the three-dimensional structure of a third embodiment of the present invention.

In addition, the zapper 10 of the present invention can be in forms as shown in FIG. 1, FIG. 2, FIG. 3, and FIG. 4, or a form of a torch as shown in FIG. 5, or a form of a garden landscaping lamp as shown in FIG. 6. In an embodiment, the zapper 10 includes a light-emitting decorative component 19 located between the lamp housing 14 and the power supply module 13 to be controlled by the work management module 133 to enhance a decorative effect of the zapper 10.

What is claimed is:
1. A zapper, comprising:
an insect-inducing light source;
an electric shock coil, disposed around the insect-inducing light source;
a power supply module, electrically connected to the insect-inducing light source and the electric shock coil;
a lamp housing, provided for the insect-inducing light source and the electric shock coil to be disposed therein and connected to the power supply module, the lamp housing comprising a plurality of lateral ribs spaced apart, a plurality of longitudinal ribs spaced apart and intersecting the plurality of lateral ribs, and a plurality of openwork portions formed between the plurality of lateral ribs and the plurality of longitudinal ribs, at least one of the plurality of longitudinal ribs is formed with a longitudinal track in openwork-shaped thereon, wherein the lamp housing further comprises a perforation formed on the base, a space connected to the perforation, and a drawer disposed in the space and capable of being taken out from a surface of the lamp housing; and
a cleaning brush, comprising a brush body disposed around the insect-inducing light source and selectively contacted to the electric shock coil, and at least one operation member connected to the brush body and operable to move along the longitudinal track, the at least one operation member comprising a connection portion extending through the longitudinal track into the lamp housing to connect to the brush body, and an operation portion exposed outside the lamp housing, wherein the at least one operation member is configured to be operated to move along the longitudinal track to drive the brush body to make a longitudinal displacement within the lamp housing to implement cleaning of the electric shock coil;

wherein the lamp housing further comprises a top end and a bottom end, and the longitudinal track comprises a trunk between the top end and the bottom end, and a manifold connected to the trunk and close to the top end, and wherein the manifold extends in a direction different from the trunk to restrict the cleaning brush in a position when the connection portion of the at least one operation member enters the manifold.

2. The zapper of claim 1, wherein the lamp housing further comprises a base and induced fan disposed on the base.

3. The zapper of claim 2, wherein the perforation is provided for the induced fan to be disposed therein.

4. The zapper of claim 3, wherein the power supply module is disposed at an upper portion of the lamp housing, and the power supply module comprises at least one solar panel, an energy storage unit, and a work management module connecting to the at least one solar panel, the insect-inducing light source, and the electric shock coil.

5. The zapper of claim 4, wherein the power supply module further comprises at least one power input port electrically connected to the work management module.

6. The zapper of claim 4, wherein the zapper further comprises at least one light-emitting decorative component disposed between the lamp housing and the power supply module.

7. The zapper of claim 6, wherein the lamp housing comprises at least one light-emitting decorative component disposed between the lamp housing and the power supply module.

8. The zapper of claim 1, wherein the power supply module is disposed at an upper portion of the lamp housing, and the power supply module comprises at least one solar panel, an energy storage unit, and a work management module connecting to the at least one solar panel, the insect-inducing light source, and the electric shock coil.

9. The zapper of claim 8, wherein the power supply module further comprises at least one power input port electrically connected to the work management module.

10. The zapper of claim 8, wherein the zapper further comprises at least one operation switch exposed on a surface of the zapper electrically connected to the work management module.

11. The zapper of claim 10, wherein the zapper further comprises at least one light-emitting decorative component disposed between the lamp housing and the power supply module.

* * * * *